United States Patent [19]
Patel

[11] Patent Number: 6,047,056
[45] Date of Patent: Apr. 4, 2000

[54] METHOD TO SUPPRESS NUMBER PORTABILITY DATABASE QUERIES FOR CALLS ROUTED ON NON-PORTED NUMBERS

[75] Inventor: Mahesh Patel, Plano, Tex.

[73] Assignee: Ericsson Inc., Research Triangle Park, N.C.

[21] Appl. No.: 08/962,478

[22] Filed: Oct. 31, 1997

[51] Int. Cl.[7] .................................................. H04M 3/42
[52] U.S. Cl. ........................ 379/207; 379/219; 379/230
[58] Field of Search .................................. 379/207, 219, 379/220, 221, 210, 211, 212, 229, 230

[56] References Cited

U.S. PATENT DOCUMENTS

| | | | |
|---|---|---|---|
| 5,625,681 | 4/1997 | Butler, II ................................. | 379/220 |
| 5,661,792 | 8/1997 | Akinpelu et al. ....................... | 379/221 |
| 5,664,005 | 9/1997 | Emery et al. ............................ | 455/422 |
| 5,764,745 | 6/1998 | Chan et al. .............................. | 379/220 |
| 5,796,813 | 8/1998 | Sonnenberg ............................. | 379/207 |
| 5,802,145 | 9/1998 | Farris et al. ............................. | 379/34 |
| 5,910,981 | 6/1999 | Bhagat et al. .......................... | 379/220 |

FOREIGN PATENT DOCUMENTS

| | | |
|---|---|---|
| 0 751 691 | 1/1997 | European Pat. Off. . |
| 2305815 | 4/1997 | United Kingdom . |

*Primary Examiner*—Scott Wolinsky
*Assistant Examiner*—Benny Q. Tieu
*Attorney, Agent, or Firm*—Jenkens & Gilchrist

[57] ABSTRACT

A system and method for suppressing redundant database queries between two switching points in a telecommunications system, where the switching points are unable to utilize the ISUP communications protocol. The system and method are implemented by using a parameter of the communications protocol to indicate whether a database query has been performed. When the receiving switch receives the information, the switch is suppressed from performing a redundant database query by the parameter of the communications protocol.

17 Claims, 5 Drawing Sheets

# METHOD TO SUPPRESS NUMBER PORTABILITY DATABASE QUERIES FOR CALLS ROUTED ON NON-PORTED NUMBERS

BACKGROUND OF THE PRESENT INVENTION

FIELD OF THE INVENTION

The present invention relates to telecommunications systems and methods for routing calls, and specifically to providing a technique for routing calls in a number portability environment.

BACKGROUND AND OBJECTS OF THE PRESENT INVENTION

Ordinarily, subscriber directory numbers are geographic in that the subscriber number relates to a certain geographic area within the domain of the numbering plan. For example, in North America, the first six digits of the subscriber directory or phone number identifies the particular switch that serves the subscriber. The last four digits identify the particular subscriber connected to the switch.

A telecommunications network uses the information in the first six digits of the phone number to route and to terminate the call. This manner of routing calls requires that the directory numbers be tied to the serving switch, as opposed to a subscriber. A subscriber who changes switches must change their directory number. If the actual directory numbers were not changed, a call to the subscriber would be routed to the wrong switch.

The requirement that the directory number be tied to the serving switch is problematic for several reasons. Persons who have to change numbers because of relocation experience a certain degree of inconvenience brought on by having to notify others of their new directory number. This requirement also presents a major hurdle for wireless mobile systems, where unlike in a conventional wire line system, a mobile system subscriber does not belong to any one switch. Instead, the mobile subscriber is served by a local switch in the area that the subscriber is currently roaming. Accordingly, a call terminating to a mobile subscriber cannot be terminated using the directory number alone. A common method, used to route a call terminating at a mobile subscriber, is to route the call to a switch operated by the mobile subscriber's service provider (the gateway switch). The gateway switch then refers to a home location register (HLR) to locate the mobile subscriber. When the mobile subscriber is located, the gateway switch determines the particular switch which serves the area within which the subscriber is roaming, obtains a temporary number from a pool of numbers at that switch, and uses the temporary number to terminate the call. This method is advantageous because it does not require changes or modifications in the routing tables of intermediate switches.

If a mobile subscriber changes service providers, however, the above method fails and the mobile subscriber will still have to change their directory number. The reason for the failure is that the directory number is used to route the call to the gateway switch, and a call routed on the called subscriber number will terminate at the wrong switch.

A solution that has been proposed is enable the intermediate switch that routes the call to recognize the directory number as a portable number. A portable number is the first six digits of any subscriber number that has ported. As is understood in the art, when the switch recognizes the number as portable, a query is launched to a database to obtain routing information. If the called number is ported (no longer served by the original switch), then a Location Routing Number (LRN) is returned which is used to route the call further.

After routing the call, the receiving switch would normally also recognize the number as portable and again launch a database query. This problem may be solved by having the sending switch insert the information obtained from the database into the packet of information that is routed. When a switch routes a call, it builds and transmits a packet of information pertaining to the call to the receiving switch. One way to format this information is according to the Integrated Services Digital Network User Part (ISUP) protocol.

When a switch prepares a packet of information to send, it builds the packet pursuant to ISUP protocol. By the setting of certain ISUP parameters the subsequent switch, upon the receipt of the information packets, may determine that the aforementionned database query has been performed, that the called number is the LRN and that the real called number resides in some other ISUP parameter. Accordingly, redundant database queries are avoided.

However, not all switches are capable of communication according to the ISUP protocol. For example, a number of switches utilize a protocol known as multi-frequency (MF). The MF protocol employs different parameters for indicating the results of a database query as in ISUP. Thus, when end-to-end ISUP is not available, multiple database queries are likely to occur resulting in longer call setup times and excessive use of network resources.

It is therefore an object of the present invention to suppress multiple database queries when a call is routed between switches that do not have end-to-end ISUP.

SUMMARY OF THE INVENTION

The present invention is directed to a method for routing communications between two switches in a telecommunications system with portable numbers which are not capable of utilizing the ISUP protocol by having the second switch determine if the directory number is portable, examining a database query flag within the non-ISUP protocol, and if the flag is set, suppressing a database query, and if not set, performing a database query and setting the flag to further suppress further database queries. The present invention is also directed to a system for routing a communication in a telecommunications system by using two switches, a communications protocol for communications between the two switches, a portable number detector for recognizing a call terminating at a portable number a query status determiner for determining whether a database query has been performed and performing a database query when one has not been performed, and an indicator which is set once the database query has been performed. The invention is also directed to an apparatus for routing telephone calls in a telecommunications network including an incoming line, an outgoing line, a portable number detector for recognizing a call terminating at a portable number, a query status determiner for determining whether a database query has been performed and performing a database query when a database query has not been performed, an indicator for indicating that a database query has been performed and a transmitter for transmitting the indicator on the outgoing line.

BRIEF DESCRIPTION OF THE DRAWINGS

The disclosed inventions will be described with reference to the accompanying drawings, which illustrate sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that these embodiments provide only a few examples of the many advantageous uses of the innovative teachings herein. It should be understood that statements made in the specification of the present application do not necessarily delimit any of the various claimed inventions. Moreover, some statements may apply to some inventive features but not to others.

Figure 1:
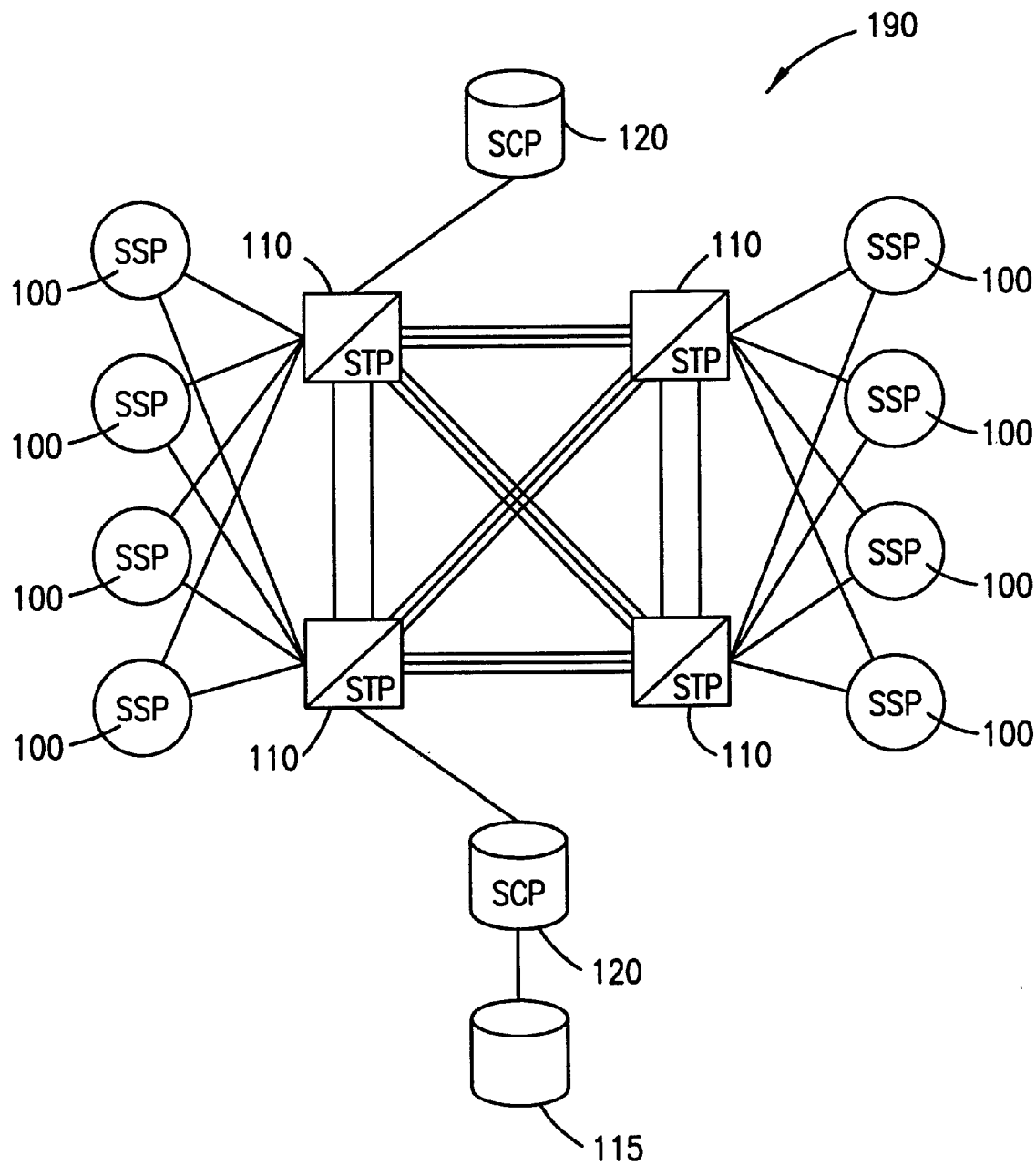
FIG. 1 is a diagram illustrating Service Switching Points serving a local exchange in a telephone network.

Referring now to FIG. 1 of the drawings, several Service Switching Points (SSPs) 100 are illustrated, each serving as local exchanges in a telephone network 190. The SSPs 100 also provide an Integrated Services Digital Network (ISDN) User Part(ISUP) protocol for Signal Transfer Points (STPs) 110, as is understood in the art.

Each STP 110 serves as a router, and switches messages received from a particular SSP 100 through the network 190 to their appropriate destinations (another SSP 100). It should be understood that the STPs 110 preferably receive such messages in packet form from the SSPs 100. These packets are either related to call connections or database queries. If the packet is a request to connect a call, the message is forwarded to a destination end office (another SSP 100), where the call will be terminated.

If, however, the message is a database query seeking additional information, the destination will, of course, be a database, such as database 115. Access to the database 115 is provided through a Service Control Point (SCP) 120, which is attached to the network 190 through a respective STP 110. In particular, the SCP 120 acts as an interface to a computer (not shown) that houses the requested information in the database 115.

Presently, a subscriber attached to one SSP 100 has the ability to move to a different SSP 100 and retain their public directory number. This feature is referred to as number portability. An obvious advantage of number portability is that other subscribers can connect to the portable subscriber without memorizing another phone number or otherwise changing to their dialing procedures.

If, however, a subscriber has been ported-out to another SSP 100, an Initial Address Message (IAM) sent by the originating SSP 100 must be modified to account for the change in the terminating SSP. Local Number Portability (LNP) refers to a database that holds a Location Routing Number (LRN), which is a ten-digit number used to uniquely identify the switch that has the ported-out number. Specifically, the LRN is the number for the recipient switch, which is the switch that has ported-in a number from another switch (called a donor switch). This ported-in number was not previously served by the recipient switch.

Typically, a SSP 100 sends an LNP query to the SCP 120, which accesses the LNP database in order to retrieve the routing information for a ported subscriber. The query response by the SCP 120 provides that SSP 100 with both the pertinent LRN, which is populated (that is placed) in a Called Party Number (CPN) parameter in the IAM, and a Ported Dialed Number (PDN), e.g., the actual dialed digits for the ported-out subscriber, which is placed in the Generic Address Parameter (GAP) in the IAM. A Forward Call Indicator (FCI) (M-bit) in the IAM is then updated to indicate that the number has been translated. The FCI M-bit is used as a fail-safe mechanism to prevent more than one LNP query from being launched on a call. However, if a given SSP 100 or STP 110 does not use the ISUP protocol, it will not be possible to update the M-bit or include the LRN.

Figure 2A:
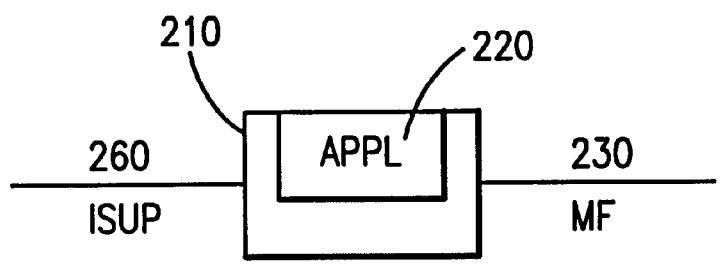
FIG. 2a is a block diagram illustrating a switch with an incoming Integrated Services Digital Network User Part (ISUP) line and an outgoing Multi-Frequency (MF) line.

Referring now to FIG. 2a, a block diagram illustrating a switch 210 with an incoming ISUP line 260 and outgoing MF line 230 is described. The switch 210 may be, but is not limited to, an SSP 100 or an STP 110, and includes an applications module (APPL) 220 which builds a communications protocol when the switch is sending or receiving a signal. Messages in this embodiment are received by the switch 210 via the ISUP line 260 and are sent via the MF line 230 (such as Multi-Frequency).

Figure 2B:
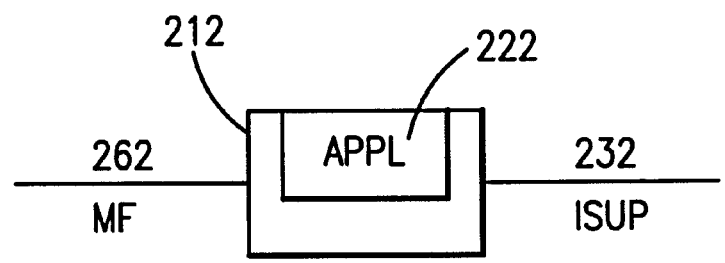
FIG. 2b is a block diagram illustrating a switch with an incoming MF line and an outgoing ISUP line.

Referring now to FIG. 2b, a block diagram illustrating a switch 212 with an incoming MF line 262 and an outgoing ISUP line 232 is described. The switch 212 may be, but is not limited to, an SSP 100 or an STP 110 and comprises an applications module (APPL) 222 which builds a communications protocol when the switch is sending or receiving a signal. Messages in this second switch embodiment are received by the switch via the MF line 262 and are sent via the ISUP line 232.

Figure 2C:
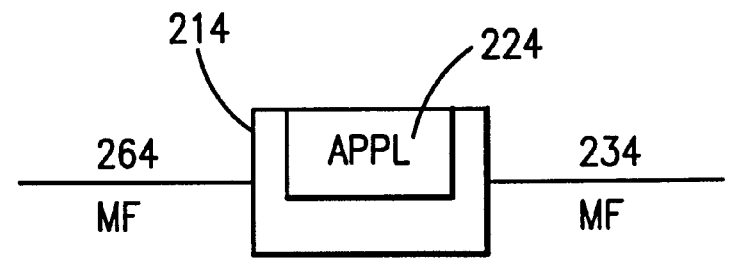
FIG. 2c is a block diagram illustrating a switch with an incoming MF line and an outgoing MF line.

Referring now to FIG. 2c, a block diagram illustrating a switch 214 with an incoming MF line 264 and an outgoing MF line is described 234. The switch 214 may be, but is not limited to, an SSP 100 or an STP 110 and comprises an applications module (APPL) 224 which builds a communications protocol when the switch is sending or receiving a signal. Messages in this third switch embodiment are received by the switch via the MF line 264 and are sent via the MF line 234.

Although the switches 210, 212, and 214 are shown with only one incoming line, 260, 262, 264, and only one outgoing line 230, 232, 234, those skilled in the art will understand that telecommunications switches (such as 100, 210, 212, or 214) have a plurality of incoming (such as 260, 262, or 264) and outgoing lines (such as 230, 232, or 264) connecting to other switches (such as 100, 210, 212, or 214) in a network. The communications protocol for the incoming (such as 260, 262, or 264) and outgoing lines (such as 230, 232, or 264) will depend on the communications protocols of the switches (such as 100, 210, 212, or 214) that the line (such as 260, 262, 264, 230, 232, or 264) connects.

Those skilled in the art will also recognize a number of ways that a switch (such as 100, 210, 212, or 214) can select which communications protocol to use. For example, this can be determined by maintaining in memory, a table identifying which protocol to utilize when communicating with another switch. Another method would be to place the table in a database (such as 115). Another way to select the communications protocol would be to send an initial request to the receiving switch (such as 100, 210, 212, or 214) and examining the reply. Yet another way would be for the switch (such as 100, 210, 212, or 214) to recognize the physical characteristics of the line (such as 260, 262, 264, 230, 232, or 264) itself and determine the communications protocol.

Figure 3:
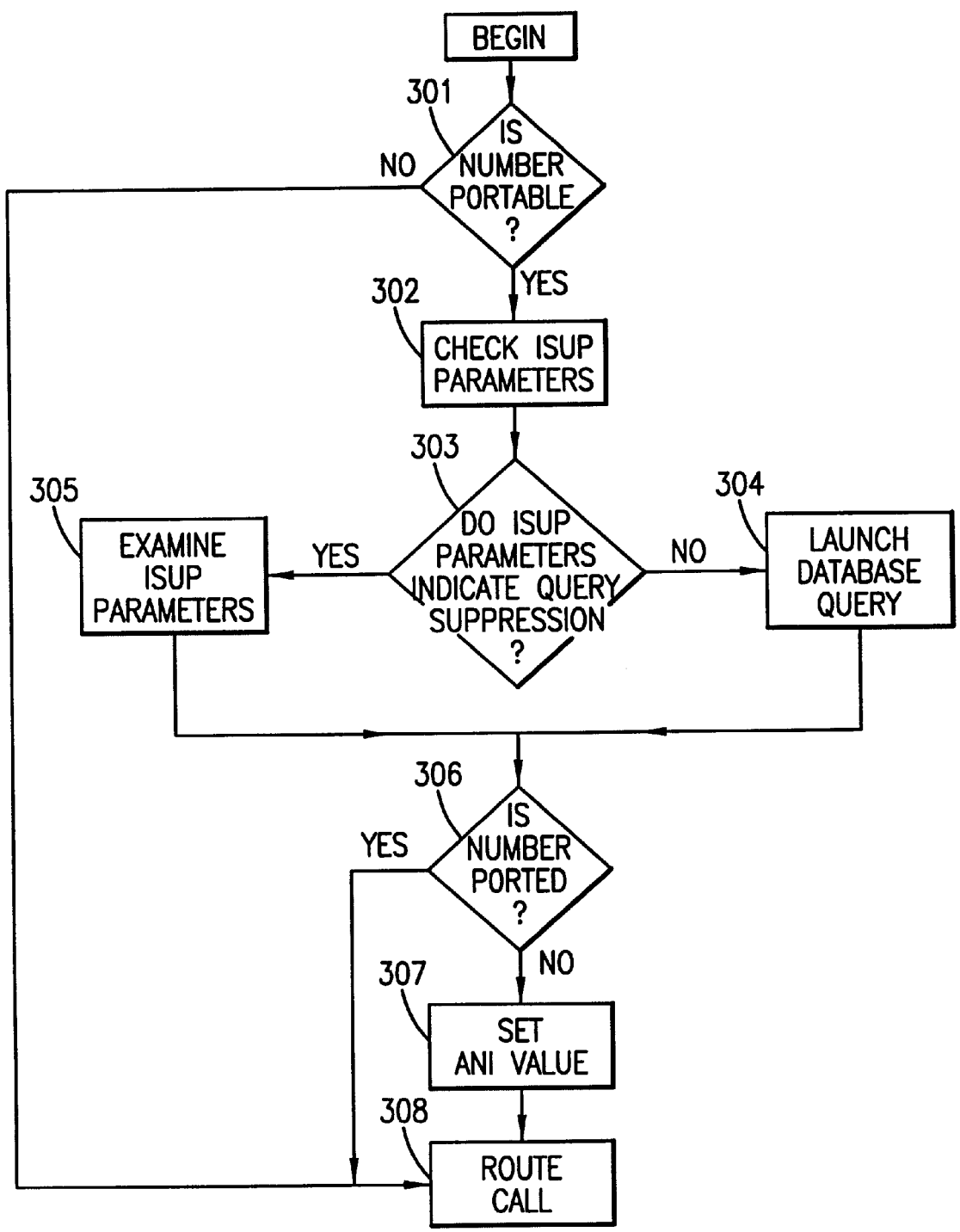
FIG. 3 is a flow diagram illustrating the operation of a switch with an incoming ISUP line and an out-going MF line.

Referring now to FIG. 3 there is shown a flow diagram illustrating the operation of the switch 210, shown in FIG. 2a, with the incoming ISUP line 260 and the outgoing MF line 230 after receiving a call. In step 301, the switch 210 first determines whether the directory number dialed is a portable number. If the number is not portable, the switch proceeds to route the call along MF line 230 (step 308). On the other hand, if in step 301 the directory number is portable, the switch 210 then checks the ISUP parameters (step 302) and determines (step 303) if a previous switch has performed a database query. If the ISUP parameters indicate that a database query was not performed, the switch will initiate such a query to the SCP 120 and obtain an LRN (step 304). If however, the parameters indicate that a database query was already performed, the switch 210 will then further examine the ISUP parameters (step 305).

In either case, the switch 210 determines whether the called directory number was ported or not (step 306). If the called directory number is not ported, the switch 210 preferably directs the APPL 220 to insert a database query suppression code in the ISUP protocol. However, since the outgoing line 230 in this embodiment is MF, this cannot be done. Instead, the switch 210 directs the APPL 220 to set an Automatic Number Identification (ANI) value, a parameter within the MF protocol, to indicate that further database inquiries need not be performed (step 307) before routing the call on the MF line 230 (step 308).

In the case where the called directory number is ported, the called directory number cannot be used for routing. Because the MF line 230 cannot be enabled to transmit the LRN, the receiving switch will therefore have to launch a database query to further route the call. Accordingly, in this instance a database query should not be suppressed and the ANI value is not set.

Figure 4:
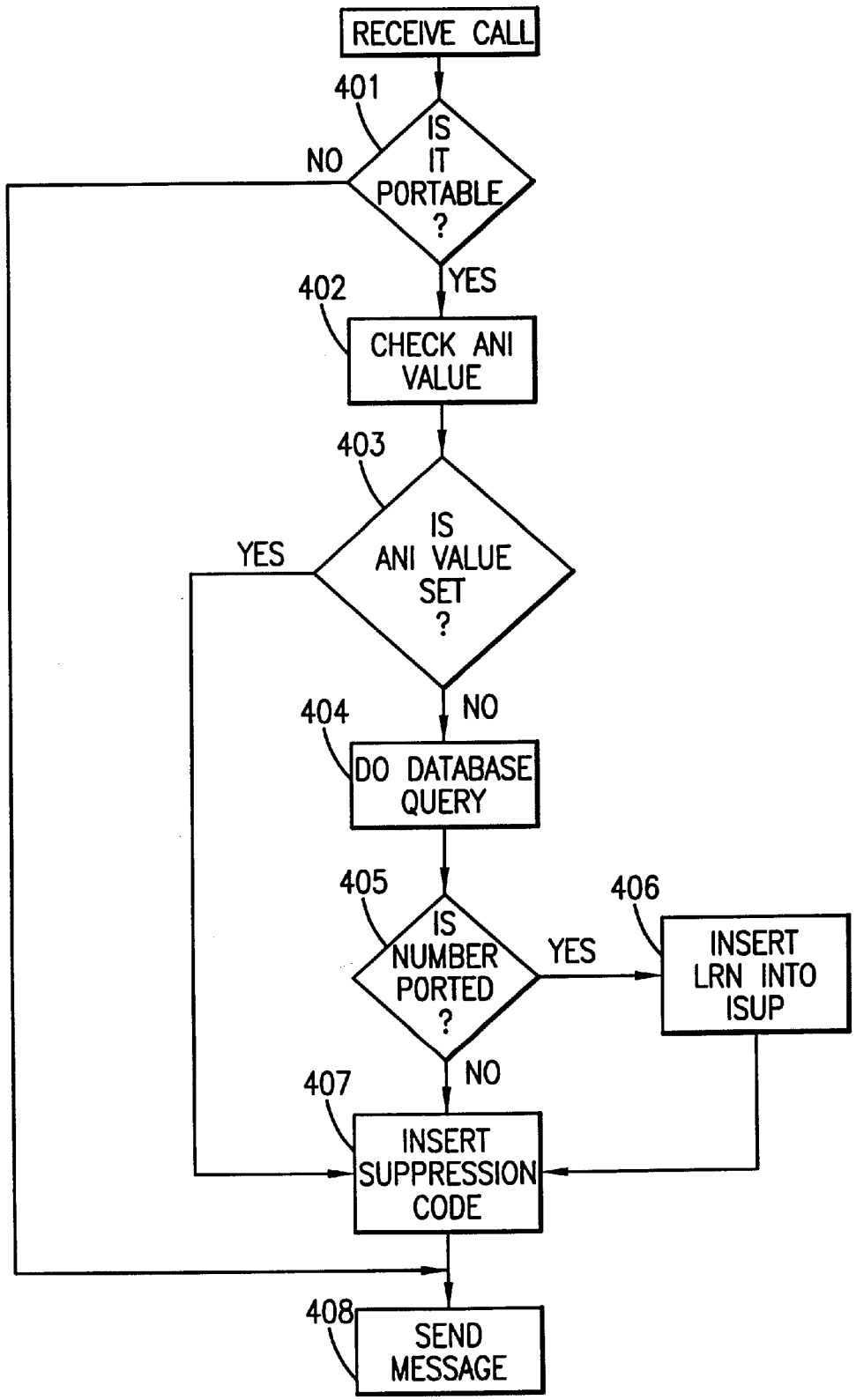
FIG. 4 is a flow diagram illustrating the operation of a switch receiving a call on a MF line and sending a call on an ISUP line.

Referring now to FIG. 4, a flow diagram illustrating the operation of the switch 212, shown in FIG. 2b, receiving a call on the MF line 262 and sending the call on the ISUP line 232. After receiving the call across the MF line 262, the switch 212 determines, based on the called directory number, whether the directory number is portable (step 401). If not, the switch 212 proceeds to send the call along the ISUP line 232 (step 410). If, however, the called directory number is portable, the switch 212 then examines the ANI value (step 402), and, based on the ANI value, determines whether a database query should be performed (step 403).

If the ANI value is set (step 403), ie., further database inquiries are unnecessary, then the switch 212 directs the application module 222 to insert a suppression code into the ISUP protocol built by the application module 222 (step 407), and the call is then transmitted on the ISUP line 232 (step 408).

If the ANI value is not set (step 403), then the switch 212 initiates a query to the SCP 120 and obtains an LRN (step 404). From the query, the switch 212 is able to determine whether the called directory number is ported (step 405). If the called directory number is so ported, then the switch 212 directs the application module 222 to insert the LRN into the ISUP protocol built by the application module 222 (step 406). If, however, the called number is not ported, this insertion step is bypassed. In either case, the switch 212 directs the application module 222 to insert a suppression code into the ISUP protocol built by the application module 222 (step 407), and the call is then transmitted on the ISUP line 232 (step 408).

Figure 5:
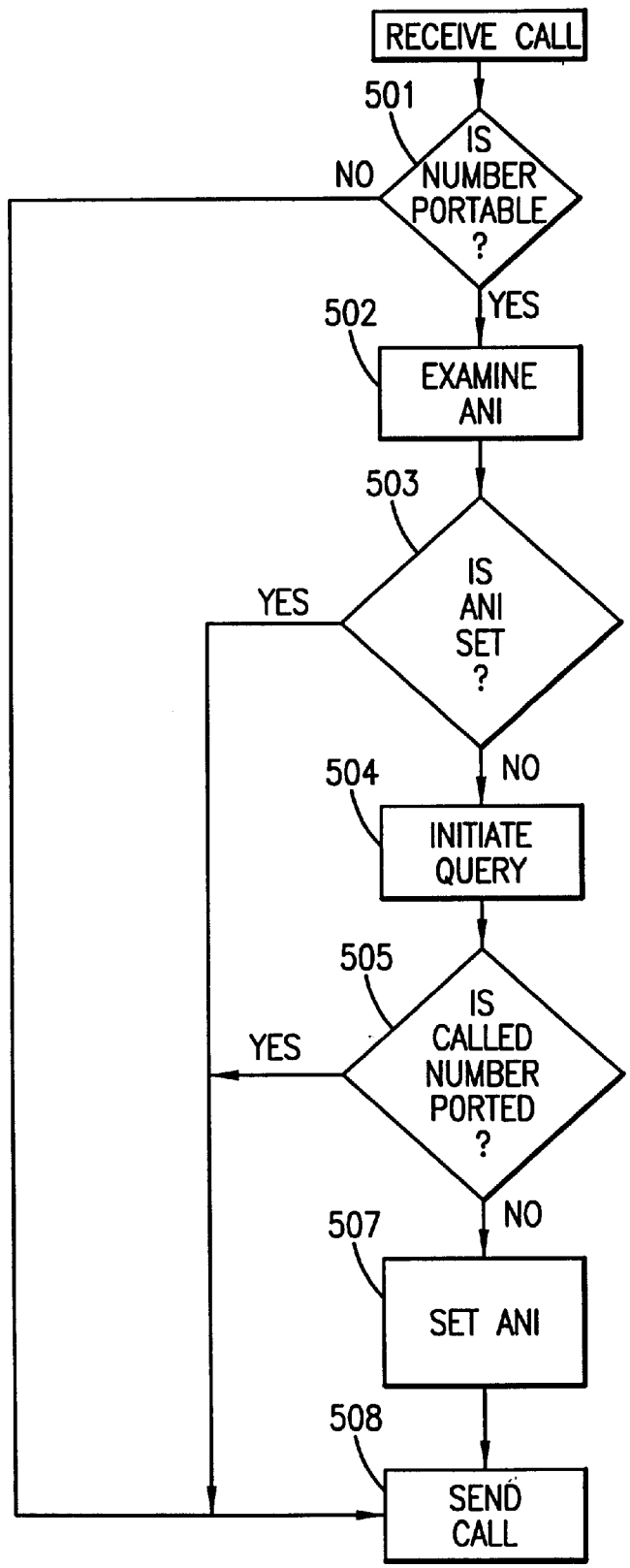
FIG. 5 is a flow diagram illustrating the operation of a switch receiving a call on a MF line and sending a call on a MF line.

With reference now to FIG. 5, a flow diagram illustrating the operation of a switch 214, shown in FIG. 2c, receiving a call on the MF line 264 and sending the call on the MF line 234 is described. After receiving the call across the MF line 264, the switch 214 determines, based on the called directory number, whether the directory number is portable (step 501). If not, the switch 214 proceeds to send the call along the MF line 234 (step 510). If the called directory number is portable, the switch 214 examines the ANI value (step 502), and based on the ANI value, determines whether a database query should be performed (step 503).

As discussed in connection with the other switch embodiments, if the ANI value is set, then the call is transmitted by the non-ISUP line 234 (step 508). If, however, the ANI value is not set, then the switch 214 initiates a query to the SCP 120 and obtains an LRN (step 504). From the query, the switch 214 is able to determine whether the called directory number is ported (step 505). If the called directory number is ported, then the call is transmitted by the MF line 234 (step 508). If the called directory number is not ported, the switch 214 directs the application module 224 to set the ANI value (step 507), and the call is transmitted by the MF line 234 (step 508).

Although the invention has been described with a certain degree of particularity, it should be recognized that elements thereof may be altered by persons skilled in the art without departing from the spirit and scope of the invention. For example, the communications protocol is not limited to MF alone. Likewise, the parameter value which indicates whether to suppress subsequent database queries need not be limited to the ANI value. Therefore, the invention is limited only by the following claims and their equivalents.

What is claimed is:

1. A method for routing a communication from a first switch to a second switch in a telecommunications system, said telecommunications system employing number portability and a first communications protocol, said method comprising the steps of:

determining, at said second switch, if a directory number associated with said communication from said first switch is a portable number, said communication being routed through said second switch if said directory number is not portable;

examining, by said second switch, a database query flag within said first communications protocol, wherein said first communications protocol is a non-Integrated Services Digital Network User Part protocol, said database query flag indicating that said directory number is non-ported; and supressing, at said second switch, a number portability database query when said database query flag is set.

2. The method of claim 1, wherein said communications protocol is a multi-frequency protocol.

3. The method of claim 2, wherein said database query flag comprises a parameter of the multi-frequency protocol.

4. The method of claim 3, wherein said parameter of the multi-frequency protocol is an automatic number identification.

5. The method of claim 1, further comprising the steps of:

launching a number portability database query where said database query flag does not indicate that said directory number is not ported to determine whether said directory number is ported; and setting said database query flag to indicate that said directory number is not ported where said directory number is not ported during said launching step.

6. The method of claim 1, further comprising the steps of:

launching a number portability database query where said database query flag does not indicate that said directory number is not ported to determine whether said directory number is ported; and setting a second database query flag within a second communications protocol to indicate that said directory number is not ported where said directory number is not ported during said launching step.

7. The method of claim 6 wherein said second communication protocol is an integrated services digital network user part protocol.

8. A system for routing communications in a telecommunications system comprising:

a first switch;

a second switch operably coupled to said first switch;

a communications protocol for communicating a given communication between said first switch and said second switch, said communications protocol being a non-Integrated Digital Services Network User Part protocol; and an application module operable to:

determine, at said second switch, if a directory number associated with said given communication from said first switch is a portable number, said communication being routed through said second switch if said directory number is non-portable;

examine, by said second switch, a database query flag within said communications protocol between said first switch and second switch, said database query flag indicating that said directory number is non-ported; and suppress, at said second switch, a number portability database query when said database query flag is set.

9. The system of claim 8, wherein said database query flag comprises a parameter of communications protocol.

10. The system of claim 8, wherein said communications protocol is a multi-frequency protocol.

11. The system of claim 10, wherein said data base query flag comprises a parameter of the multi-frequency protocol.

12. The system of claim 11, wherein said parameter of the multi-frequency protocol comprises an automatic number identification.

13. A switch for routing communications in a telcommunications network comprising:

an incoming line for receiving a given communication;

an outgoing line for sending said given communication; and an application module operable to:

determine, at said switch, if a directory number associated with said given communication from another switch is a portable number, said communication being routed through said switch if said directory number is non-portable;

examine, by said switch, a database query flag within a communications protocol between said switch and another switch, said database query flag indicating that said directory number is non-ported; and suppress, at said switch, a number portability database query when said database query flag is set.

14. The switch of claim 13, wherein said incoming line utilizes a multi-frequency communications protocol.

15. The switch of claim 13, wherein said outgoing line utilizes a multi-frequency communications protocol.

16. The switch of claim 15, wherein said database query flag further comprises a parameter of the multi-frequency protocol.

17. The switch of claim 16, wherein said parameter of the multi-frequency protocol is an automatic number identification.

* * * * *